United States Patent Office 3,597,488
Patented Aug. 3, 1971

3,597,488
PROCESS FOR MAKING GRIGNARD REAGENTS
Lawrence H. Shepherd, Jr., Baton Rouge, La., assignor to Ethyl Corporation, New York, N.Y.
No Drawing. Filed Feb. 25, 1969, Ser. No. 802,272
Int. Cl. C07f 3/02
U.S. Cl. 260—665G
17 Claims

ABSTRACT OF THE DISCLOSURE

Alpha-olefins undergo an addition reaction with organomagnesium halides in the absence of a catalyst provided the organomagnesium halide is a secondary alkyl, tertiary alkyl, or 2-alkenyl magnesium compound. By conducting this reaction in an ether reaction medium having a basicity equal to or greater than that of diethyl ether the intermolecular addition does not proceed to any appreciable extent beyond the addition of one unit of the olefinic hydrocarbon per hydrocarbyl group in the initial organo-magnesium reactant. Thus, the process proceeds quite cleanly to essentially pure higher molecular organomagnesium compounds.

This invention relates to the preparation of organomagnesium compounds and more particularly to the uncatalyzed intermolecular addition of simple olefinic hydrocarbons to certain organomagnesium reactants.

BACKGROUND

In U.S. 3,161,689 Cooper and Finkbeiner disclose that olefins of the formula R—CH=$CH_2$ react with an alkyl Grignard reagent of the formula R'MgX in the presence of titanium or zirconium catalysts such as $TiCl_4$. Where the concentration of titanium or zirconium catalyst is low, the reaction predominately goes in the direction of producing a new Griggnard reagent derived from the olefin displacing the R' group of the alkyl Grignard reagent. On the other hand, where the titanium or zirconium catalyst is in a higher concentration range, there is increased tendency toward the formation of addition products of the formula R'RCH—$CH_2$MgX. Also see Cooper and Finkbeiner, J. Org. Chem. 27, 1493 (1962); Finkbeiner and Cooper, J. Org. Chem. 27, 3395 (1962); Finkbeiner and Cooper, Am. Chem. Soc., Div Petrol. Chem., Preprints 8 (2), B71–B78 (1963).

Tarrant and Heyes, J. Org. Chem. 30, 1485 (1965) describe the reaction of polyfluoro olefins with allylic Grignard reagents. In general, good yields of allylfluoroethylenes are achieved. The authors suggest a reaction mechanism involving addition between the allylic Grignard reagent and the polyfluoro olefin followed by elimination of magnesium dihalide. This reaction was successfully applied to such olefins as tetrafluoroethylene, chlorotrifluoroethylene, bromotrifluoroethylene, unsym-dichlorodifluoroethylene and hexafluoropropene. No reaction occurred between allylmagnesium bromide and trifluoroethylene.

Eisch and Husk, J. Am. Chem. Soc., 87, 4194 (1965), report that on treating allyldiphenylcarbinol in diethyl ether with two equivalents of allylmagnesium bromide (25° C. for 36 hours) an addition reaction occurred. Hydrolysis yielded the corresponding 5-hexenyl carbinol.

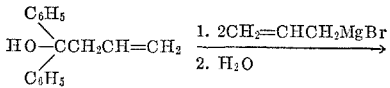

The authors indicated that further research would probe the generality of this reaction by the use of other unsaturated carbinols and amines.

The addition of various fulvenes to certain Grignard reagents has been described [Fuson and Porter, J. Am. Chem. Soc., 70, 895 (1948); Fuson, DeWald and Gaertner, J. Org. Chem., 16, 21 (1951); Fuson and Mumford, J. Org. Chem., 17, 255 (1952)]. The mechanism suggested for these reactions involves participation of the conjugated exocyclic structure of the fulvenes.

Ziegler, Koster and Grimme indicate in U.S. 3,217,020 that ethylene reacts with magnesium alkyls to produce predominately polyethylene, there being no formation of longer chain magnesium alkyls through addition of the ethylene.

THE INVENTION

This invention involves the discovery that simple alpha-olefinic hydrocarbons such as ethylene react with secondary alkyl, tertiary alkyl and 2-alkenyl magnesium compounds in a basic ether reaction medium at elevated temperatures and in the absence of catalysts to produce higher molecular weight magnesium compounds. In particular, uncatalyzed intermolecular addition occurs between the olefinic hydrocarbon and the initial organomagnesium reactant. The reaction does not appear to proceed to any significant extent beyond the addition of one olefinic group to each alkyl or alkenyl group present in the initial organomagnesium reactant. Thus, although the chain is lengthened, the lengthening is not a progressive reaction of the character normally referred to as "chain growth." Thus in instances where essentially a single product of increased molecular weight is desired, the process of this invention will be found of advantage.

Unlike the process of Cooper and Finkbeiner, supra, no catalyst is added or used in the process of this invention. The present invention may be practiced with reagents and raw materials of conventional commercial purity.

Unlike the processes of Eisch et al. and Fuson et al., supra, the process of this invention utilizes a simple olefinic hydrocarbon rather than an unsaturated tertiary carbinol or a fused ring polycyclic ethylenic hydrocarbon.

Exemplary reactions of this invention are given below.

(a) Uncatalyzed intermolecular addition of ethylene to an isopropyl Grignard reagent which yields a 3-methylbutyl Grignard reagent:

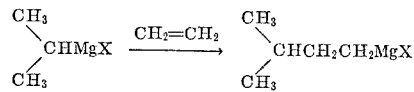

(b) Preparation of neohexyl Grignard reagents by uncatalyzed addition of ethylene to a tertiary butyl Grignard reagent:

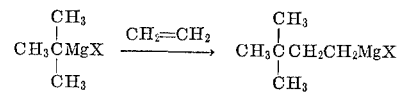

(c) Formation of 4-pentenyl Grignard reagent by reacting ethylene with an allyl Grignard reagent in the absence of a catalyst:

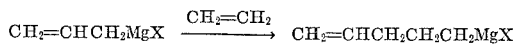

(d) Production of 2-methyl-4-pentenyl Grignard reagents via uncatalyzed addition of propylene to allyl Grignard reagents:

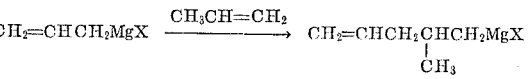

(e) Uncatalyzed addition reaction between isobutylene and allyl Grignard reagent yielding 2,2-dimethyl-4-pentenyl Grignard reagents:

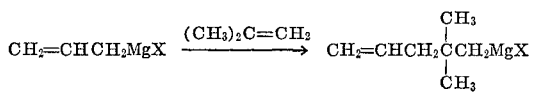

(f) Reaction between ethylene and 2-butenyl Grignard reagent whereby 3-methyl-4-pentenyl Grignard reagents are produced:

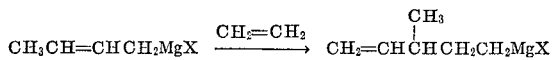

Other reactions of this invention will now be apparent to those skilled in the art.

Various alpha-olefinic hydrocarbons may be used in practicing this invention. For example, use may be made of ethylene, propylene, butene-1, isobutylene, pentene-1, 2-methylbutene-1, 3-methylbutene-1, hexene-1, 2-methylpentene-1, 3-methylpentene-1, 4-methylpentene-1, 2,3-dimethylbutene-1, 3,3-dimethylbutene-1, and similar higher homologous compounds such as the 1-heptenes, 1-octenes, 1-decenes, 1-dodecenes, 1-tetradecenes, 1-hexadecenes, 1-octadecenes and the like. Thus in general the olefin reactant for the present process will have the formula

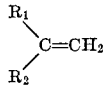

where $R_1$ is hydrogen or an alkyl group of up to about 16 carbon atoms and $R_2$ is hydrogen or methyl. Generally speaking, the lower alpha-olefinic hydrocarbons tend to be more reactive than the higher members and thus the use of alpha-olefinic hydrocarbons, especially vinyl olefins, containing up to about eight carbon atoms in the molecule is preferred. Alpha-olefinic hydrocarbons carrying a cyclic substituent, such as styrene, alpha-methyl styrene, vinyl cyclohexane, p-methyl styrene, allylbenzene, vinyl cyclohexene, and the like are also suitable. The use of ethylene is particularly preferred as it undergoes the desired addition reactions quite readily and produces the addition products in good yield.

The organomagnesium reactants employed in accordance with this invention are the secondary alkyl, tertiary alkyl, or 2-alkenyl Grignard reagents. Thus, this reactant has the formula RMgR' where R is a secondary alkyl, tertiary alkyl, or 2-alkenyl group and R' is halogen. Mixtures of the Grignard reagent and its corresponding diorganomagnesium compound may also be employed. Indeed some investigators have suggested that a Grignard reagent involves an equilibrium between the organomagnesium halide and a mixture of the magnesium dihalide and diorganomagnesium. Poly-Grignard reagents such as butane-1,4-dimagnesium bromide and pentane-1,5-dimagnesium chloride may also be employed in the process of this invention.

Considering the nature of the hydrocarbon group(s) present in the organomagnesium reactant, the 2-alkenyl compounds are superior to the tertiary alkyl compounds, which in turn are superior to the secondary alkyl compounds both with respect to reactivity and yield of desired product. Accordingly, the use of the tertiary alkyl compounds constitutes a preferred embodiment of this invention. A particularly preferred embodiment of this invention involves use of the 2-alkenyl compounds.

Illustrative organomagnesium reactants are:

Secondary alkyl compounds: isopropyl magnesium chloride, isopropyl magnesium bromide, isopropyl magnesium iodide, sec-butyl magnesium chloride, sec-butyl magnesium bromide, sec-butyl magnesium iodide, 2-pentyl magnesium chloride, 3-pentyl magnesium bromide, 2-octyl magnesium chloride, 5-undecyl magnesium bromide, and the like;

Tertiary alkyl compounds: t-butyl magnesium chloride, t-butyl magnesium bromide, t-butyl magnesium iodide, t-amyl magnesium chloride, t-amyl magnesium bromide, t-amyl magnesium iodide, 1,1,2-trimethylpropyl magnesium bromide, 1,1,3,3-tetramethylbutyl magnesium bromide, and the like;

2-alkenyl compounds: allylmagnesium chloride, allylmagnesium bromide, allylmagnesium iodide, 2-butenyl magnesium chloride, 2-butenyl magnesium bromide, 2-butenyl magnesium iodide, 2-pentenyl magnesium chloride, 2-hexenyl magnesium bromide, 4-methyl-2-pentenyl magnesium bromide, and the like.

The reactions of this invention are conducted in ether reaction media having a basicity equal to or greater than that of diethyl ether. See for example Hamelin, Bull. soc. chim. France, 1961, 684–92 and Hamelin and Hayes, ibid. 692–7. Thus, use may be made of such ethers as dimethyl ether, diethyl ether, dibutyl ether, tetrahydrofuran, 2-methyl-tetrahydrofuran, 2,5-dimethyltetrahydrofuran, 1,4-dioxane, the dimethyl ether of ethyleneglycol, the dibutyl ether of ethylene glycol, the dimethyl ether of diethylene glycol, the diethyl ether of diethylene glycol, the dibutyl ether of diethylene glycol, and the like. Pyridine or other strong Lewis base complexing solvents may also be suitable. Ordinarily the use of diethyl ether and dibutyl ether is preferred.

Reaction temperatues between about 50 and about 200° C. will usually suffice, temperatures falling in the range of about 100 to about 175° C. being preferred. Depending upon the reactants, solvent and temperature used, the pressure may range from atmospheric pressure up to about 100 atmospheres or more. The reactions involving ethylene, propylene and the other normally gaseous olefinic hydrocarbons are best conducted at elevated presures in a closed reaction system such as an autoclave. When using ethylene, pressures in the range of 40 to 70 atmospheres are desirable. The usual precautions for Grignard reactions should be observed—e.g., the system should be kept essentially anhydrous and exposure to the atmosphere should be kept at a minimum.

This invention will become still further apparent from a consideration of the following illustrative examples.

EXAMPLE I

Allylmagnesium bromide and ethylene 100 milliliters of a solution of allylmagnesium bromide in diethyl ether (0.8 mmoles of Grignard reagent per milliliter) was placed in an autocalve and pressured to 400 p.s.i. with ethylene. The system was then heated to 125° C. for three hours while holding the ethylene pressure at 800 p.s.i. The autoclave was opened and the solution made up to 100 ml. by addition of a small amount of diethyl ether. Titration of 2 ml. aliquots of the reaction solution showed it to contain 0.73 mmoles of Grignard reagent per milliliter. Another 2 ml. aliquot of the product solution was hydrolyzed and the gases were collected and analyzed by vpc. These hydrolysis gases were found to consist of 45 percent of diethyl ether and 55 percent of pentene-1. On the basis of the quantities involved it was established that the allylmagnesium bromide and ethylene had reacted quantitatively to produce 4-pentenyl magnesium bromide. Deuterolysis of a sample of the product liberated 5-deutero-pentene-1 whose identity was established by NMR. The remaining 4-pentenyl magnesium bromide solution was poured onto a mixtue of Dry Ice and diethyl ether and the mixture stirred under a nitrogen atmosphere. Work up of the product by acidifying with aqueous HCl followed by water washing, drying over MgSO₄, and vacuum removal of the solvent provided a carboxylic acid. This was found to be 5-hexenoic acid, both by its NMR spectrum and by its boiling point (103°

C. at 12 mm. Hg). The overall yield of the 5-hexenoic acid from the initial allyl Grignard reagent was 64 percent.

EXAMPLE II

2-butenyl magnesium bromide and ethylene 2-butenyl magnesium bromide (26.3 mmoles) in diethyl ether was treated with ethylene for 2.5 hours (at 800 p.s.i. and 125° C.). Hydrolysis of a product sample yielded a gas which on analysis by mass spectrograph was found to contain a major ingredient having a molecular weight of 84. By passing a portion of the hydrolysis gas through a 20 foot SE–30 column at 80° C. a separation was effected as between this gas and the diethyl ether to permit further identification. The mass spectrograph pattern of the gas of molecular weight 84 showed that it was 3-methyl-pentene-1. Deuterolysis of another portion of the reaction solution liberated 5-deutero-3-methyl-pentene-1 whose identity was established by comparing the NMR spectrum with that of an authentic sample of 3-methyl-pentene-1. It was thus established that the product of the reaction was 3-methyl-4-pentenyl magnesium bromide. It was produced in a yield of at least 62 percent based on the 2-butenyl Grignard reagent employed.

EXAMPLE III

Allylmagnesium bromide and isobutylene

Allylmagnesium bomide (78.5 mmoles in 100 milliliters diethyl ether solution) was heated at 145° C. with isobutylene (555 mmoles) for three hours. Hydrolysis of the reaction product and analysis of the hydrolysis products showed that 4,4-dimethylpentene-1 was formed. Thus, the reaction produced 2,2-dimethyl-4-pentenyl magnesium bromide.

EXAMPLE IV

Tert-butyl magnesium chloride and ethylene

A solution of t-butyl magnesium chloride (50 mmoles in 100 milliliters diethyl ether) was treated at 125° C. for three hours with ethylene (600–800 p.s.i.). NMR analysis indicated that the reaction solution contained t-butyl magnesium chloride and neohexyl magnesium chloride in a 1:1 ratio. Proof of the neohexane structure was obtained by hydrolyzing a portion of the reaction product and comparing the NMR vpc spectra of the liberated hydocrabon with those of authentic samples.

EXAMPLE V

Tert-butyl magnesium chloride and ethylene

The t-butyl Grignard-ethylene reaction of Example IV was repeated under slightly more rigorous conditions (3 hours at 150° C. and 800 p.s.i. ethylene). Hydrolysis of a portion of the product indicated that isobutane and neohexane were present in a ratio of 1:7, respectively. The reaction solution was carbonated by pouring it onto a mixture of Dry Ice in diethyl ether. The product was worked up with aqueous HCl, extracted with ether, dried with HgSO$_4$ and the solvent removed under vacuum. The product, 4,4-dimethylvaleric acid, was distilled at reduced pressure, b$_{15}$ 112° C., reported b$_{13}$ 112° C. [Bartlett and Stiles, J. Am. Chem. Soc., 77, 2806 (1955)]. The acid formed an S-benzylthiuronium salt: m. 150.5–151.5° C., reported m. 150–151° C. (Bartlett and Stiles, loc. cit.). The yield of this acid based on the initial t-butyl magnesium chloride was 40 percent.

EXAMPLE VI

Isopropylmagnesium bromide and ethylene

Isopropylmagnesium bromide (105 mmoles) in 100 milliliters diethyl ether was treated in an autoclave with ethylene (900 p.s.i.) at 165° C. for two hours. The product ether solution was found by hydrolysis to contain 46 mmoles (44 percent yield) of 3-methylbutyl magnesium bromide. Carbonation of the reaction solution with Dry Ice followed by work up according to the general procedure of Example V led to the isolation of 6.05 grams of crude organic acids. On vacuum distillation, 3.70 grams of isocaproic acid were isolated (30 percent yield based on the isopropyl Grignard reagent). This acid was characterized by its boiling point (81° C. at 5 mm. Hg) and by its anilide derivative: m. 111–112° C., reported 111° C.

EXAMPLE VII

Allylmagnesium chloride and ethylene

Allylmagnesium chloride was prepared by adding allyl chloride to a stirred mixture of particulate magnesium metal in diethyl ether. The resultant allylmagnesium chloride/diethyl ether system was a white, slushy mixture exemplifying the fact that this Grignard reagent does not have a high solubility in diethyl ether. A portion of this thick white system (100 ml.) was placed in a 250 ml. autoclave and the autoclave was pressurized to 600 p.s.i. with ethylene at 25° C. The closed system was then heated to 125° C. for three hours. On cooling to room temperature, 83 ml. of a clear colorless solution was obtained from the autoclave. A portion of this solution was subjected to hydrolysis. The gas which was liberated was found by vpc to consist of 58 percent pentene-1, the balance being diethyl ether. No propylene was observed in the hydrolysis gas. Thus, the ethylene added quantitatively to the allylmagnesium chloride even though the reaction system was not homogeneous at the outset.

The organomagnesium products producible by the process of this invention undergo the typical reactions of conventionally prepared organomagnesium compounds. For example, the organomagnesium products produced by the process of this invention may be oxidized and then hydrolyzed in order to produce alcohols. Similarly, the products of the present process may be treated with carbon dioxide and then hydrolyzed in order to produce carboxylic acids.

I claim:
1. A process of increasing the molecular weight of an alkyl or alkenyl Grignard reagent by an amount corresponding to the addition of a single olefinic group to the alkyl or alkenyl group of the initial alkyl or alkenyl Grignard reagent which comprises reacting (i) a 1-olefin selected from the group consisting of styrene, alpha-methyl styrene, vinyl cyclohexane, p-methyl styrene, allyl benzene, vinyl cyclohexene, and compounds of the formula

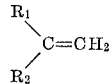

where R$_1$ is hydrogen or an alkyl group of up to about 16 carbon atoms and R$_2$ is hydrogen or methyl with (ii) a secondary alkyl, tertiary alkyl or 2-alkenyl Grignard reagent in an ether reaction medium having a basicity equal to or greater than that of diethyl ether, said reaction being conducted at an elevated reaction temperature within the range of about 50 to about 200° C. and in the absence of a catalyst.

2. The process of claim 1 wherein said 1-olefin is ethylene and said reaction is conducted at an elevated pressure.

3. The process of claim 1 wherein said 1-olefin is ethylene, wherein said reaction is conducted at a pressure between about 40 and 70 atmospheres, and said reaction medium is diethyl ether or dibutyl ether.

4. The process of claim 1 wherein said temperature falls in the range of about 100 to about 175° C.

5. The process of claim 1 wherein said 1-olefin is a vinyl olefin hydrocarbon containing up to about 8 carbon atoms in the molecule and wherein said reaction temperature falls in the range of about 100 to about 175° C.

6. The process of claim 1 wherein a 2-alkenyl Grignard reagent is subjected to said reaction.

7. The process of claim 1 wherein an allylmagnesium halide is subjected to said reaction.

8. The process of claim 1 wherein a 2-butenyl magnesium halide is subjected to said reaction.

9. The process of claim 1 wherein a tertiary alkyl Grignard reagent is subjected to said reaction.

10. The process of claim 1 wherein a tertiary butyl magnesium halide is subjected to said reaction.

11. The process of claim 1 wherein said 1-olefin is ethylene, said reagent is an allyl Grignard reagent, said reaction medium consists essentially of diethyl ether, and said reaction is conducted at a pressure between about 40 and about 70 atmospheres whereby a 4-pentenyl Grignard reagent is prepared.

12. The process of claim 1 wherein said 1-olefin is ethylene, said reagent is a 2-butenyl Grignard reagent, said reaction medium consists essentially of diethyl ether, and said reaction is conducted at a pressure between about 40 and about 70 atmospheres whereby a 3-methyl-4-pentenyl Grignard reagent is prepared.

13. The process of claim 1 wherein said 1-olefin is isobutylene, said reagent is an allyl Grignard reagent, said reaction medium consists essentially of diethyl ether, and said reaction is conducted at a pressure between about 40 and about 70 atmospheres whereby a 2,2-dimethyl-4-pentenyl Grignard reagent is prepared.

14. The process of claim 1 wherein said 1-olefin is ethylene, said reagent is a tertiary butyl Grignard reagent, said reaction medium consists essentially of diethyl ether, and said reaction is conducted at a pressure between about 40 and about 70 atmospheres whereby a neohexyl Grignard reagent is prepared.

15. The process of claim 1 wherein said 1-olefin is ethylene, said reagent is an isopropyl Grignard reagent, said reaction medium consists essentially of diethyl ether, and said reaction is conducted at a pressure between about 40 and about 70 atmospheres whereby a 3-methylbutyl Grignard reagent is prepared.

16. The process of claim 1 wherein said 1-olefin is ethylene.

17. The process of claim 1 wherein said 1-olefin is ethylene, wherein the reaction temperature falls in the range of about 100 to about 175° C. and wherein said reaction is conducted at an elevated pressure of up to about 100 atmospheres.

References Cited
UNITED STATES PATENTS

| | | | |
|---|---|---|---|
| 2,938,932 | 5/1960 | Normant | 260—665 |
| 3,161,689 | 12/1964 | Cooper et al. | 260—665 |

OTHER REFERENCES

Kharasch et al.: Grignard Reactions of Nonmetallic Substances, Prentice Hall, Inc., New York, N.Y., 1954, pp. 87–91.

Fuson et al.: J. Org. Chem., 18 (1953), pp. 570–4.

Podall et al.: J. Org. Chem., 23 (1953), pp. 1848–52.

TOBIAS E. LEVOW, Primary Examiner

A. P. DEMERS, Assistant Examiner

U.S. Cl. X.R.

260—526, 632